July 30, 1935.  W. H. RADFORD  2,009,591
GUIDE
Filed Feb. 10, 1930
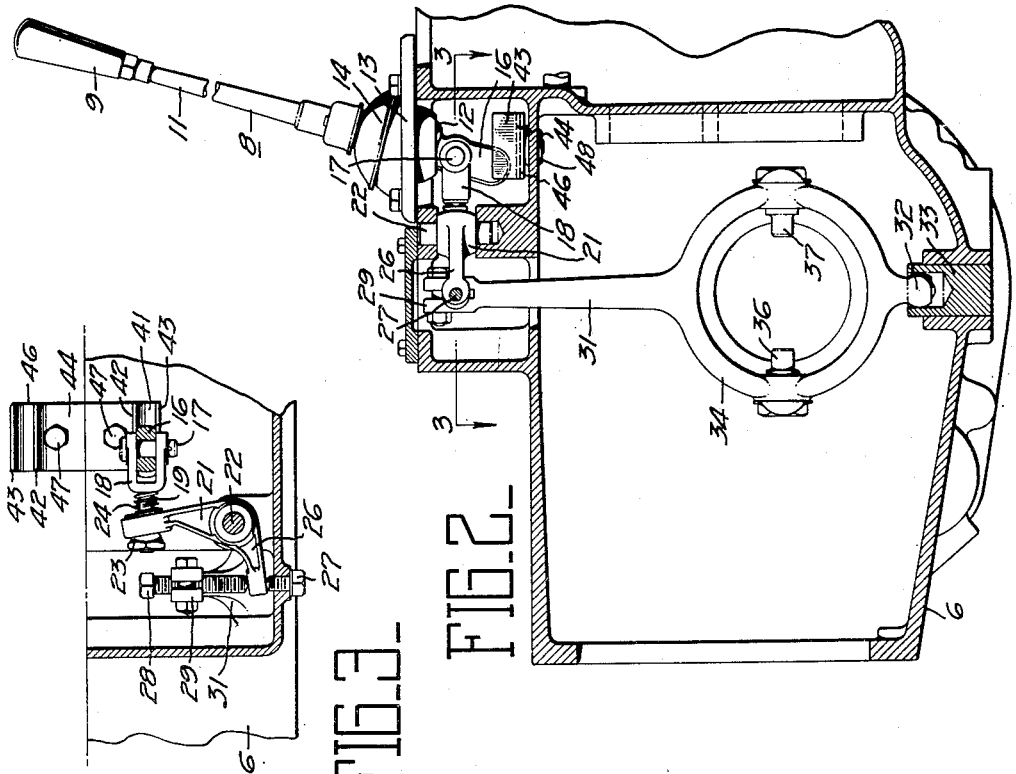
INVENTOR.
William H. Radford
BY White, Prost, Fiske & Lothrop
ATTORNEYS.

Patented July 30, 1935

2,009,591

UNITED STATES PATENT OFFICE 2,009,591

GUIDE

William H. Radford, San Leandro, Calif., assignor to Caterpillar Tractor Co., San Leandro, Calif., a corporation of California Application February 10, 1930, Serial No. 427,391

11 Claims. (Cl. 74—473)

My invention relates to power transmission machinery, particularly to control mechanism adapted to occupy a plurality of control positions, and is especially related to a constraining or confining means for the clutch shifting mechanism of such transmissions.

In certain types of tractors it is customary to steer or guide the tractor by means of a variable division of power between the driving means for the vehicle. In order that the power may be regulated to steer the vehicle as desired, there is ordinarily provided a manually controllable means for adjusting the division of power. Such manual controls are subjected to extraordinarily severe service. Not only are the manual controls on a tractor strenuously used but they are often grossly abused as well. As they are usually situated on a tractor they furnish convenient hand grips to aid the tractor operator in mounting and dismounting from the machine, thus introducing material lateral stresses.

It is therefore an object of my invention to provide a mounting or guide for the control levers of a vehicle such as a tractor.

Another object of my invention is to provide a mounting for the control levers which in an improved manner renders them durable and serviceable.

The foregoing and other objects are attained in the embodiment of the invention shown in the drawing, in which Fig. 1 is a cross section on a transverse vertical plane of a transmission housing of a tractor showing the guide of my invention installed therein.

Fig. 2 is a side elevation of a transmission housing disclosing the guide of my invention installed therein, portions of the transmission housing being cut away on a vertical longitudinal plane to disclose the interior construction.

Fig. 3 is a detail showing in plan the guide of my invention, portions of the transmission casing being disclosed in section on the line 3—3 of Fig. 2.

In its preferred form, the guide of my invention comprises a pair of parallel lugs forming a guide way and generally includes a pair of nested members fastened to a transmission housing for confining to planar movement an extension on one end of a ball-mounted lever.

While I have chosen to describe my invention as it is embodied in a tractor and particularly in connection with the transmission mechanism thereof, the invention is applicable to a number of environments. In a usual tractor installation, however, there is provided a transmission housing 6, ordinarily of cast metal, on which are mounted one or more control levers, such as 7 and 8, arranged for convenient operation by the driver of the tractor. Since these levers and their associated parts are substantially identical a description of but one of them will suffice.

Each lever preferably includes a grip 9 mounted at one extremity of a shank 11 which, intermediate its ends, is enlarged to provide a spherical portion or ball 12 confined between suitably formed plates 13 secured to the upper face of the transmission housing 6. A guard plate 14 is customarily provided over the plates 13 to prevent the egress of oil from the transmission casing and the ingress of dirt thereto. Depending from the ball 12 is an extension 16 of the lever which is pierced by an aperture to form a journal for a pin 17 securing a clevis 18 to the extension.

The clevis is part of a linkage for controlling a steering clutch, not shown, of the tractor and is extended by a threaded shank 19 passing through an enlarged aperture in one leg of a bell crank 21 pivoted, as at 22, to the transmission housing. An adjusting nut 23 maintains the relationship of the leg 21 and the shank 19 against the urgency of a spring 24. The bell crank is made with a second leg 26 adapted to move between two extreme positions one of which is established by a stud 27 piercing the transmission housing. The leg 26 is adapted to abut against an adjusting screw 28 which is clamped in adjusted position in a split sleeve 29 formed at the upper end of a control yoke 31. The lower end of the control yoke is provided with a spherical bushing 32 confined in a cylindrically bored plug 33 pressed into the transmission housing, while between the ends of the yoke is provided an annulus 34 having removable studs 36 and 37 projecting radially therefrom from diametrally opposite points. The studs 36 and 37 are adapted to engage a steering or clutch mechanism in the customary fashion.

By virtue of the linkage described, movement of the lever 8 is effective to translate the studs 36 and 37 in substantially a horizontal transverse plane to actuate the associated steering mechanism, not shown. Since the lever 7 is connected through a similar train of linkage, its movement is also effective to translate substantially in a horizontal transverse plane the corresponding studs connected therewith.

In order to assist in confining the levers 7 and 8 to movement in a single plane and in order to strengthen them for resistance against lateral displacement, I provide a suitable guide for the lower extremities 16 thereof. The lower portion of the extension 16 is preferably flattened, as particularly indicated in Fig. 3, to be received in a guide way 41 bounded by a pair of lugs 42 and 43 which are conveniently formed by the upturned extremities of a pair of nested members 44 and 46 such as the channels disclosed in the drawing. These nested channels are preferably held in place by studs 47 received in bosses 48 formed in the transmission housing. Although the nested channels are the preferred construction and serve admirably to confine to planar motion the lower extensions on both the levers 7 and 8, nevertheless comparable guide lugs can be separately and individually fabricated, if desired, or the upstanding lugs can be formed integrally with the transmission housing 6 itself.

By virtue of the construction of my invention, there are provided guides for the operating levers 7 and 8 which confine them to planar movement and which are extremely simple and rugged. The guides withstand easily the side thrust on the levers and adequately resist such side thrust even though it is applied at a considerable distance from the fulcrum of the lever so that they can be relatively light in weight but ample in strength. Furthermore, because of the provision of the lever constraining guide for each operating lever, the universal lever mounting comprising ball 12 and plates 13 can be effectively employed; the type of mounting being extremely desirable because it, especially in conjunction with the guard plate 14, provides an economical and effective seal between the lever and the casing into which the lever extends.

It is to be understood that I do not limit myself to the form of the guide shown and described herein, as the invention, as set forth in the following claims may be embodied in a plurality of forms.

I claim:

1. In a guide, a transmission housing, a pair of levers, flattened extensions on said levers, ball mountings for securing said levers to said housing, and a pair of nested channels fastened to said housing to provide guides constraining each of said extensions to movement in one plane.

2. In a guide, a transmission housing, ball mounted shift levers on said housing, and a pair of nested channels fastened to said housing, said channels engaging said levers for constraining said levers to sliding movement relative to said housing.

3. In a guide, a housing, levers mounted to pivot with respect to said housing, an extension on each of said levers, and a pair of nested members fastened to said housing and forming a pair of spaced guideways, in which said extensions engage for confining each of said levers to movement in one plane.

4. In a guide, a housing, a pair of U-shaped members nested to provide a pair of parallel guideways, means for fastening said members to said housing, a pair of ball mounted shift levers on said housing, and extensions on said levers adapted to slide in said guide ways.

5. The combination with a shift lever having a pivot of an element connected to said lever and adapted to be shifted by said lever, and a guide for said lever comprising a pair of fixed nested channels.

6. The combination with a shift lever having a pivot with a fixed nested channel guide for one end of said lever, and an element connected to said lever intermediate said pivot and said nested channel guide, and adapted to be shifted by said lever.

7. In a guide, a pair of levers, flattened extensions on said levers, mountings for pivoting said levers, and a pair of nested channels of different widths fastened with said flattened extensions swinging between faces of said nested channels.

8. The combination with a plurality of shift levers, each lever having a pivot and an element connected to said lever and adapted to be shifted by said lever, and a guide for said levers formed of a pair of nested channels.

9. The combination with a plurality of shift levers, each lever having a pivot and an element connected to said lever and adapted to be shifted by said lever, and a guide for said levers formed of a pair of U-shaped members nested to provide a pair of parallel guideways.

10. The combination with a plurality of shift levers, each lever having a pivot and an element connected to said lever and adapted to be shifted by said lever, and a guide for said levers formed of a pair of nested channels of different widths positioned to provide a plurality of guideways for said levers.

11. In a guide, a pair of levers, elements rigid with said levers, mountings for pivoting said levers, and a pair of nested channels of different widths fastened to provide a pair of guideways formed by faces of said nested channels, the elements being slidable in said guideways.

WILLIAM H. RADFORD.